US011516687B2

(12) United States Patent
Chasko et al.

(10) Patent No.: US 11,516,687 B2
(45) Date of Patent: Nov. 29, 2022

(54) MONITORING SECURED NETWORK USING NETWORK TAP DEVICES

(71) Applicant: Landis+Gyr Innovations, Inc., Alpharetta, GA (US)

(72) Inventors: Stephen Chasko, Marietta, GA (US); James P. Hartman, Monument, CO (US); Damien Hugoo, Roswell, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 24 days.

(21) Appl. No.: 17/154,327

(22) Filed: Jan. 21, 2021

(65) Prior Publication Data

US 2022/0232400 A1 Jul. 21, 2022

(51) Int. Cl.

| H04W 24/08 | (2009.01) |
|---|---|
| H04W 12/04 | (2021.01) |
| H04W 12/06 | (2021.01) |
| H04W 24/10 | (2009.01) |
| H04W 84/18 | (2009.01) |
| H04W 88/08 | (2009.01) |

(52) U.S. Cl.
CPC .......... *H04W 24/08* (2013.01); *H04W 12/04* (2013.01); *H04W 12/06* (2013.01); *H04W 24/10* (2013.01); *H04W 84/18* (2013.01); *H04W 88/08* (2013.01)

(58) Field of Classification Search
CPC ..... H04W 24/08; H04W 24/10; H04W 12/04; H04W 12/06; H04W 84/18; H04W 88/08
USPC ...................................................... 370/329
See application file for complete search history.

(56) References Cited

U.S. PATENT DOCUMENTS

| 10,200,869 | B2 * | 2/2019 | Norrman | ............... H04W 24/08 |
| 10,649,838 | B2 * | 5/2020 | Johnston | ............. G06F 11/0709 |
| 10,992,652 | B2 * | 4/2021 | Putatunda | ........... H04L 63/1408 |
| 11,246,046 | B2 * | 2/2022 | Henry | .................. H04W 24/08 |
| 2015/0339919 | A1 * | 11/2015 | Barnett | ................ H05B 47/105 |
| | | | | 340/907 |

(Continued)

FOREIGN PATENT DOCUMENTS

WO 2016209712 12/2016

OTHER PUBLICATIONS

International Application No. PCT/US2022/012750, International Search Report and Written Opinion dated Apr. 8, 2022, 12 pages.

*Primary Examiner* — Mong-Thuy T Tran
(74) *Attorney, Agent, or Firm* — Kilpatrick Townsend & Stockton LLP

(57) ABSTRACT

A network tap device is configured to join a secured network to be monitored through a joining process. The joining process includes communicating with the access point to obtain security keys of the monitored network and communicating with the access point to obtain a network address for the network tap device. After joining the secured network, the network tap device collects the network data on the secured network. Collecting the network data includes detecting network traffic on the monitored network, the network traffic containing encrypted data and unencrypted data, decrypting the encrypted data in the network traffic using the security keys to generate decrypted data, and adding the decrypted data and unencrypted data to the network data. The network tap device further transmits the collected network data to a monitoring workstation via a data transmission network.

20 Claims, 5 Drawing Sheets

(56) References Cited

U.S. PATENT DOCUMENTS

| | | | |
|---|---|---|---|
| 2016/0073278 A1* | 3/2016 | Roessler | H04W 24/08 370/252 |
| 2017/0272317 A1* | 9/2017 | Singla | H04L 67/02 |
| 2018/0351970 A1 | 12/2018 | Majumder et al. | |
| 2020/0169572 A1* | 5/2020 | Jana | H04L 63/1466 |
| 2021/0385070 A1* | 12/2021 | Watson | H04L 63/062 |
| 2021/0409981 A1* | 12/2021 | Yan | H04L 43/024 |
| 2022/0070699 A1* | 3/2022 | Thiyagarajan | H04W 24/08 |

\* cited by examiner

MONITORING SECURED NETWORK USING NETWORK TAP DEVICES

TECHNICAL FIELD

This disclosure relates generally to network communication monitoring and more particularly relates to monitoring a secured network using network tap devices that join the secured network as a part of the network.

BACKGROUND

Monitoring data communications occurring on a network can be useful in many applications including cybersecurity and debugging. Data transmitted over the network can be collected and analyzed to identify problems associated with the network. For example, by analyzing the data transmitted on the network, attacks launched against one or more devices on the network can be identified or improper configurations causing communication issues between network devices can be discovered.

To collect the communication data, network tap devices can be deployed to the network to listen to the communications occurring over the network. However, existing network listening mechanisms use network tap devices that are placed near network devices of the network being monitored but are not part of the network. As a result, for a secured network, the network tap devices in the existing listening mechanisms can only access the content of non-encrypted data which significantly limits the amount and type of data that can be collected. Consequently, the analysis based on the limited communication data leads to many security and other network issues remaining undetected.

SUMMARY

Systems and methods are disclosed for monitoring a secured network by joining network tap devices to the secured network to collect data. In one example, a system includes a headend system configured for managing network devices in a monitored network and an access point configured for managing communications between a subset of the network devices in the monitored network, and a network tap device. The subset of the network devices includes network nodes and a network tap device. The network tap device is in connection with the access point through the monitored network and managed by the access point and the headend system. The network tap device is configured for joining the monitored network as a network device of the monitored network. Joining the monitored network includes communicating with the access point to obtain security keys of the monitored network, and communicating with the access point to obtain a network address for the network tap device. The network tap device is further configured for collecting network data for the monitored network, which includes detecting network traffic including encrypted data and unencrypted data on the monitored network, decrypting the encrypted data in the network traffic using the security keys to generate decrypted data, and adding the decrypted data and unencrypted data to the network data. The network tap device is further configured for connecting to a monitoring workstation via a data transmission network different from the monitored network; and transmitting the collected network data to the monitoring workstation via the data transmission network.

In another example, a network tap device includes a transceiver configured to communicate both in a monitored network and in a data transmission network different from the monitored network. The network tap device is configured for joining the monitored network as a leaf node of the monitored network, including communicating with a network manager to obtain security keys of the monitored network and communicating with the network manager to obtain a network address for the network tap device. The network tap device is further configured for collecting network data for the monitored network, comprising: detecting, on the monitored network, network traffic including encrypted data and unencrypted data, decrypting the encrypted data in the network traffic using the security keys to generate decrypted data, and adding the decrypted data and unencrypted data to the network data. The network tap device is further configured for transmitting the collected network data to a monitoring workstation via the data transmission network.

In yet another example, a method performed by a network tap device includes joining a monitored network as a leaf node of the monitored network, comprising: communicating with a network manager of the monitored network to obtain security keys of the monitored network, and communicating with the network manager to obtain a network address for the network tap device. The method further includes collecting network data for the monitored network, comprising: detecting network traffic on the monitored network, the network traffic comprising encrypted data and unencrypted data, decrypting the encrypted data in the network traffic using the security keys to generate decrypted data, and adding the decrypted data and unencrypted data to the network data. The method also includes connecting to a monitoring workstation via a data transmission network different from the monitored network, and transmitting the collected network data to the monitoring workstation via the data transmission network.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
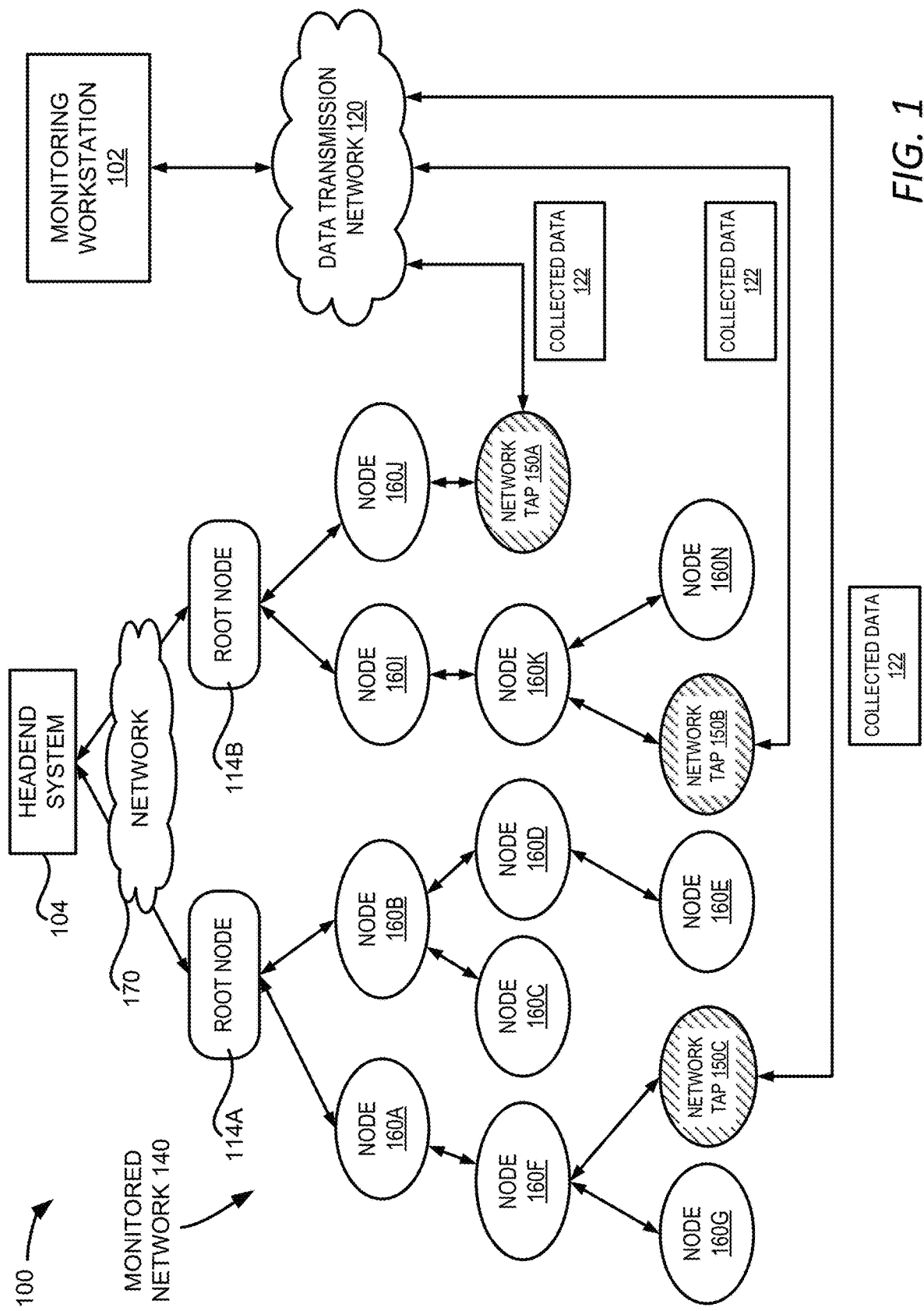
FIG. 1 is a diagram illustrating an example of an operating environment for monitoring a secured network by joining network tap devices to the secured network, according to certain aspects of the present disclosure.

Systems and methods are provided for monitoring a secured network by joining network tap devices to the secured network to collect data. A network tap device can be deployed to the location to be monitored and further joins the secured network as a network device of the secured network by following the normal joining process of the secured network. As a result, the network tap device can obtain the network keys and credentials. The network tap device can thus listen both encrypted and non-encrypted traffic data on the secured network. The network tap device can use the network keys to decrypt the encrypted traffic and to validate the integrity checks on the network traffic. The collected traffic data can be sent to a monitoring workstation for further analysis. During the monitoring, the network tap devices can be managed by a central or headend system of the secured network to allow for or forbid the network tap devices to join the secured network, or to remove the network tap devices from the secured network.

In one example, a system includes a headend system configured for managing network devices in a secured network that includes multiple network devices communicating with each other through the secured network. To monitor the secured network, one or more network tap devices are deployed at different locations of the secured network. Each of the network tap devices is configured to join the monitored network by communicating with a corresponding access point of the secured network to obtain security keys and security credentials for the monitored network. The network tap device further communicates with the access point to exchange routing information and to obtain a network address for the network tap device.

After joining the secured network, each of the network tap devices operates as a passive leaf node on the secured network and does not participate in network operations in the monitored network such as the routing of the network. The network tap device also minimizes its transmission as much as possible and focuses on listening to network traffic data on the monitored network at its location. These network traffic data may include both encrypted data and unencrypted data. For the encrypted data, the network tap device decrypts the encrypted data using the security keys to generate decrypted data. The decrypted data and unencrypted data are both included in the collected network data.

To transmit the collected network data, each of the network tap devices joins a data transmission network different from the monitored network and establishes a secure channel between the network tap device and a monitoring workstation in the data transmission network. As the network data from the secured network are collected at the network tap devices, each of the network tap devices transmits the collected data to the monitoring workstation through the respective secure channels in the data transmission network. The monitoring workstation can analyze the received network data to identify issues or characteristics associated with the secured network for purposes such as debugging or network security. Based on the analysis results, the monitoring workstation may recommend or instruct the headend system to modify the secured network by, for example, moving certain network devices to different locations, removing certain network devices from the network, adding new network devices to the network, or reconfiguring the network devices in the network to improve the performance, security or other aspects of the network.

As described herein, certain aspects provide improvements to network monitoring. Utilizing a secured and authenticated join of a network tap device to a secured network allows the network tap device to decrypt and validate the authentication of networking traffic. This provides more comprehensive data in the collected network data, which enables a more accurate analysis of the secured network. Since the network tap device joins the monitored network as a passive leaf node, it does not participate in routing or network control traffic and thus has minimal impact on the network. Joining the network tap device as a node on the secure network also allows the network tap device to be managed through the headend system to ensure controlled join, tracking, and removal of a network tap device, thereby reducing the security risks caused by the network tap devices and also for the maintenance of the network tap devices, such as firmware update, without locally accessing these devices.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other types of language or combinations of languages may be used to implement the teachings contained herein in software to be used in programming or configuring a computing device.

Exemplary Operating Environment

FIG. 1 shows an illustrative operating environment 100 for monitoring a secured network by joining network tap devices to the secured network to collect data. The operating environment 100 includes a secured network 140 that is monitored by network tap devices, also referred to as "monitored network 140." The monitored network 140 shown in FIG. 1 includes multiple nodes 160A-160N (which may be referred to herein individually as a node 160 or collectively as the nodes 160). The monitored network 140 can be a radio frequency (RF) mesh network (such as an IEEE 802.15.4 network), a Wi-Fi network, a cellular network, an Ethernet, a power line carrier network, or any other wired or wireless network. Correspondingly, the network node 160 can be an RF radio, a computer, a mobile device, a power line network device, or another type of device that can directly communicate with other devices on the monitored network 140.

In examples where the monitored network 140 is a mesh network, the nodes 160 in the mesh network may include measuring nodes for collecting data from the respective deployed location of the nodes, processing nodes for processing data available to the nodes, router nodes for forwarding data received from one node to another node in the monitored network 140, or nodes that are configured to perform a combination of these functions. The nodes 160 are further configured to communicate with each other so that data packets containing messages or other data can be exchanged between the nodes 160.

In one example, the monitored network 140 can be associated with a resource distribution network, such as a utility network, to deliver measurement data obtained in the resource distribution network. In this example, the nodes 160 can include meters such as electricity meters, gas meters, water meters, steam meters, etc., and be deployed to the various locations of the resource distribution network to deliver measurement data obtained in those locations. The node 160 can be implemented to measure various operating characteristics of the resource distribution network, such as the characteristics of resource consumption. In a power distribution network, example characteristics include, but are not limited to, average or total power consumption, the peak voltage of the electrical signal, power surges, and load changes. The nodes 160 transmit the collected data through the monitored network 140 to, for example, a corresponding root node 114A or root node 114B (which may be referred to herein individually as a root node 114 or collectively as the root nodes 114).

A root node 114 of the monitored network 140 may be configured to communicate with the nodes 160 to perform operations such as managing the nodes 160, collecting data from the nodes 160, and forwarding data to a headend system 104. A root node 114 can also be configured to function as a node to measure and process data itself. The root node 114 may be a personal area network (PAN) coordinator, a gateway, or any other device capable of communicating with the headend system 104. The root node 114 ultimately transmits the generated and collected data to the headend system 104 via another network 170, such as the Internet, an intranet, or any other data communication network. The headend system 104 can function as a central processing system that receives streams of data or messages from the root node 114. The headend system 104, or another system associated with the utility company, can process or analyze the collected data for various purposes, such as billing, performance analysis, or troubleshooting.

The headend system 104 is further configured to manage the monitored network 140, such as authenticating nodes 160 in the monitored network 140, authorizing network keys and credentials, admitting or removing nodes 160, and so on. In some examples, the monitored network 140 may also include an access point configured to manage the monitored network 140 under the authorization of the headend system 104. An access point may be a root node 114, a router, or another device on the network 140 capable of managing the monitored network 140 as described herein. The access point may maintain the security credentials for the network devices on the monitored network 140 (e.g., the nodes 160) and manage the network keys used in the monitored network 140. The access point may also be configured to perform various security operations such as issuing security credentials and network keys to network devices and authenticating the network devices when they join the monitored network 140, updating and revoking security credentials and network keys when needed, removing network devices from the network 140, and so on. In some implementations, the access point may communicate with the headend system 104 when authenticating a newly joined network device. The access point may also remove network devices from the monitored network 140 at the request of the headend system 104.

The access point may also be configured to manage the routing of the network traffic. For example, when a new network device joins the monitored network 140, the access point can communicate with the new network device to establish routing information and assign a network address for the new network device so that the monitored network 140 is able to route network traffic to the new network device, such as an IP address, a LAN address and the like.

To monitor the communications on the monitored network 140, one or more network tap devices 150A-150C (which may be referred to herein individually as a network tap device 150 or collectively as the network tap devices 150) can be deployed near the nodes 160 to be monitored. The network tap device 150 may be a stand-alone network tap device or part of an existing network device. For instance, one of the radios of a multi-radio gateway or a multi-radio takeout point (which is sometimes referred to as a collector) can be dedicated as a network tap device 150. In examples, if the communication behaviors of a group of nodes 160 show abnormality, a network tap device 150 can be deployed to the geographic location of the group of nodes 160 for debugging the group of node 160 or for detecting security problems associated with the group of nodes. In some cases, if a large geographical area needs to be covered, more than one network tap device 150 can be deployed to that area each covering a region in the geographical area. In cases where the network tap device 150 is a part of an existing network device, the deployment of the network tap device 150 may not be as flexible as a stand-alone network tap device 150.

To capture comprehensive data on the monitored network 140, the network tap device 150 is configured to join the monitored network 140 and become a network device on the monitored network 140. The joining process can include, for example, the network tap device 150 initially joining the network so that it can communicate with its neighbors. The joining process may also include authenticating the network tap device 150 so that it has the proper keys and credentials to decrypt encrypted traffic on the monitored network 140, and associating the network tap device 150 to the network 140 so that it can be addressed and manage from the headend system 104. Additional details regarding the network tap device 150 joining the monitored network 140 are provided in the following with regard to FIGS. 3 and 4.

After the network tap device 150 joins the monitored network 140, the network tap device 150 can listen or collect any network traffic that can be detected by the network tap device 150, including encrypted or unencrypted network traffic directed to the network tap device 150 or other nodes 160. Here, "network traffic," "network communications," "network data" are used interchangeably and refer to data transmitted from one network device (transmitting device) to another network device (receiving device) over the monitored network 140. The transmitting device and the receiving device may or may not include the network tap device 150. In other words, even if the network communications are not originated from or directed to the network tap device 150, the network tap device 150 can still collect them as long as the network tap device 150 can detect these communications. As described in more detail below, the network tap device 150 operates as a leaf node and does not route any packets nor advertise itself as a network node. It is configured to minimally participate in the monitored network 140, such as providing base-level configuration mechanisms, allowing for firmware download, or answering an internet control message protocol (ICMP) ping, and so on. As such, in some examples, the transmissions performed by the network tap device 150 are limited to transmissions needed to maintain the functionality of the network tap device 150 and to keep the network tap device 150 staying in the monitored network 140, such as responses to networking requests directed at the network tap device 150, basic network hygiene traffic to maintain the network presence of the network tap device 150, and application traffic specific to the network tap device 150.

If the detected network traffic is encrypted, the network tap device 150 can use its network keys to decrypt the network traffic thereby providing raw data of the pure network interactions in the collected data 122. The network tap device 150 can also use the network keys to validate integrity checks on the received network traffic. The network tap device 150 can further collect physical information associated with the detected communication data, such as the signal strength of a message in the detected data, the symbol rate of the detected communication data, or both. The detected traffic data, unencrypted or decrypted, the physical information associated with the detected communication data can all be included in the collected data 122. Additional details regarding the network tap device 150 collecting data on the monitored network 140 are provided in the following with regard to FIG. 2.

It should be noted that in some examples, the network tap device 150 joins the monitored network 140 loosely and minimally participates in the monitored network 140. The network tap device 150 can maintain time and configurations to ensure that it can stay joined sufficiently to listen to all traffic on the monitored network 140. For instance, the network tap device 150 can synchronize itself with the nodes 160 on the monitored network 140, and perform channel hopping according to the channel hopping sequences of the network 140 in order to listen to the traffic on different channels. The network tap device 150 can receive some base level networking traffic and reply as appropriate. This can include, for example, routing information so that data can be routed to the network tap device 150, network configuration, and management traffic, such as a Ping command, key revocation, and key updating mechanisms. The network tap device 150 is configured to operate as a leaf node and does not provide routing for network traffic data. As such, the access point or a network manager of the monitored network 140 can keep the network tap device 150 unknown to the nodes 160 on the monitored network 140 except for the parent node of the network tap device 150 for routing purposes. Further, the network tap device 150 is configured to minimize its transmissions so that it can detect as much traffic data as possible. For example, the network tap is configured to generate as little traffic as possible to maintain connectivity to the network/access point.

As shown in FIG. 1, the network tap device 150 can be configured to transmit the collected data 122 to a monitoring workstation 102. Transmission of the collected data 122 can be performed over a data transmission network 120. The network tap device 150 can have different radios for monitoring the monitored network 140 and for sending data to the workstation over the data transmission network 120. The data transmission network 120 can be an Ethernet, a fiber network, a cellular network, a power line carrier, or any network other than the monitored network 140 that can be used to transmit the collected data 122 to the monitoring workstation 102. In some implementations, the communication channel between the network tap device 150 and the monitoring workstation 102 is a secured channel so that the collected data 122 containing decrypted traffic data can be securely transmitted to the monitoring workstation 102. The secured channel can be established through, for example, the virtual private network (VPN), the transport layer security (TLS), the IPsec, or any combination thereof. In other implementations, the link between the network tap device 150 and the monitoring workstation 102 may be a physically isolated or protected network link. Using the data transmission network 120 to transmit the collected data 122 to the monitoring workstation 102 can limit the disruption on the monitored network 140 as collected data 122 may contain a large data set which affects the throughput of the monitored network 140 if they were transmitted via the monitored network 140.

In examples, the network tap device 150 streams the collected data 122 to the monitoring workstation 102. For instance, a file transfer protocol or bulk export protocol can be utilized to transfer collected data 122 as they are received at the network tap device 150. The network tap device 150 can be further configured to throttle or batch collected data 122 in the case where the network connection in the data transmission network 120 incurs data loss. Depending on the application and the purpose of deploying the network tap devices 150 to the monitored network 140, the monitoring workstation 102 can perform various analyses on the collected data 122 to identify issues or discover characteristics of the monitored network 140. For example, if the locations of the network tap devices 150 are known to the monitoring workstation 102, the monitoring workstation 102 can detect whether a node 160 has moved based on the collected data 122 using the triangulation process. In another example, the monitoring workstation 102 can detect the hidden node problem in the monitored network 140 using the collected data 122. For instance, the collected data 122 from multiple network tap devices 150 may show that two nodes 160 are communicating with a third node 160 at the same time causing communication collisions and therefore the third node 160 is unable to receive the communicated data from either of the two nodes 160. The monitoring workstation 102 can employ any existing tool, such as a security incident and event management tool, to perform the analysis on the collected data 122.

In some implementations, the monitoring workstation 102 and the headend system 104 are separate systems, and the analysis performed at the monitoring workstation 102 does not impact the operations of the headend system 104. In other implementations, the monitoring workstation 102 is part of the headend system 104 or otherwise in communication with the headend system 104. The analysis results can be provided to the headend system 104 to better manage the monitored network 140. For example, the monitoring workstation 102 can provide analysis results to the headend system 104 to show that the network tap devices 150 are not properly deployed and communications between certain nodes 160 are not collected. In this case, the headend system 104 can instruct the network tap devices 150 to be repositioned in the monitored network 140 and manage the network tap device 150 by removing and rejoining the network tap device 150 to facilitate the repositioning. The analysis results can also help the headend system 104 to better understand the communications between the nodes 160 in the monitored network 140 and reconfigure these nodes 160 if needed.

Figure 2:
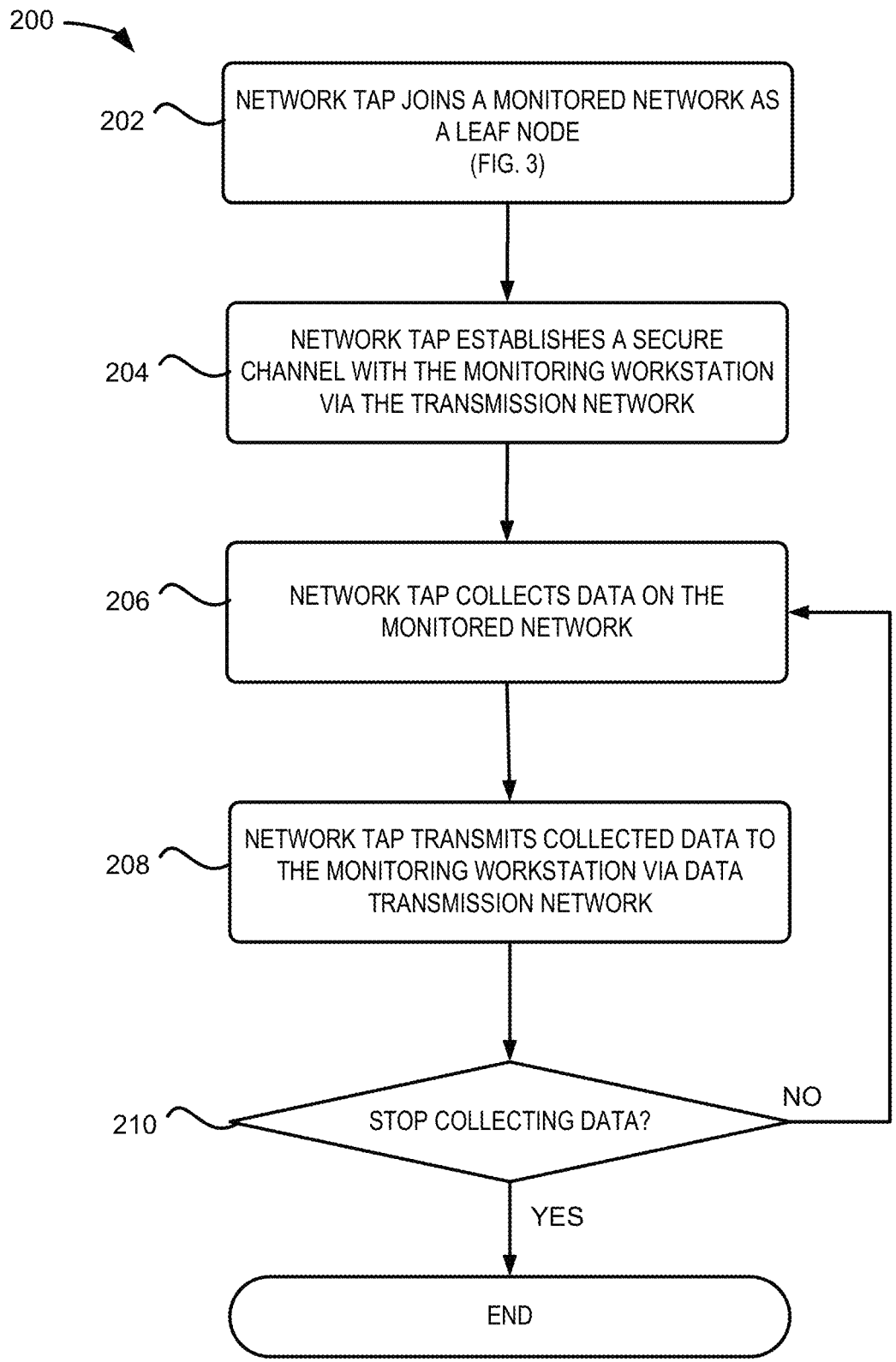
FIG. 2 is a flowchart illustrating an example of a process for monitoring a secured network by joining a network tap device to the secured network, according to certain aspects of the present disclosure.

FIG. 2 depicts a flowchart illustrating an example of a process 200 for monitoring a secured network 140 by joining a network tap device 150 to the secured network 140, according to certain embodiments of the present disclosure. One or more devices (e.g., the network tap devices 150) implement operations depicted in FIG. 2 by executing suitable program code. For illustrative purposes, process 200 is described with reference to certain examples depicted in the figures. Other implementations, however, are possible.

Figure 3:
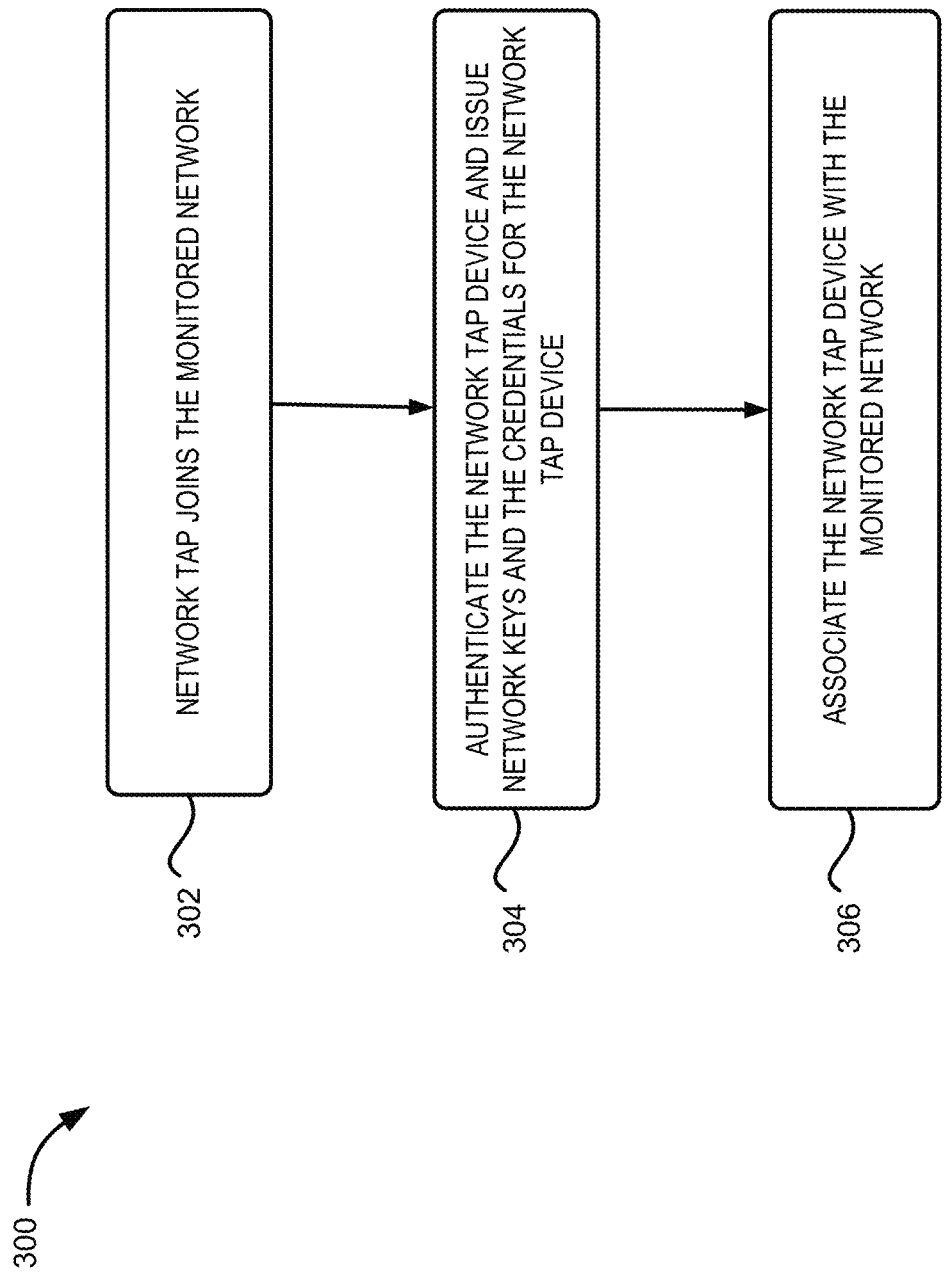
FIG. 3 is a flowchart illustrating an example of a process for joining a network tap device to a monitored secured network, according to certain embodiments of the present disclosure.

At block 202, the process 200 involves the network tap device 150 joining the network 140 as a leaf node. The joining can follow the normal operations and communications defined by the network protocol implemented in the monitored network 140 including, for example, network advertisement, network node authentication, network key exchange, network node association, etc. FIG. 3 shows an example of a process for a network tap device 150 joining the monitored network 140. Different from other nodes 160 in the monitored network 140, the network tap device 150 joins the monitored network 140 as a network tap device identified through, for example, its identifier, its device name, or a certificate. As will be discussed in detail in the following with regard to block 206, as a network tap device 150, the network tap device 150 will minimally participate in the network 140 and focus more on network data listening. After the network tap device 150 joins the monitored network 140, the network tap device 150 has the network keys and credentials and thus the network tap device 150 is able to decrypt the traffic data it receives from the monitored network 140.

At block 204, the process 200 involves the network tap device 150 establishing a secure channel with the monitoring workstation 102 over the data transmission network 120. For example, the network tap device 150 can employ network security mechanisms such as the VPN, the TLS, the IPsec, or any combination thereof to build a secured channel with the monitoring workstation 102. In other implementations, the link between the network tap device 150 and the monitoring workstation 102 may be a physically isolated or protected network link. In those scenarios, the link itself is secure and there is no need to build an additional secure channel over the link and this block can be skipped.

At block 206, the process 200 involves the network tap device 150 collecting communication data on the monitored network 140. The network tap device 150 can include any data that it can detect on the monitored network 140 into the collected data 122. For example, the collected data 122 can include the raw data of each communication it captures on the monitored network 140. The raw data can include, but are not limited to, the synchronization packet used to synchronize the receiver with the transmitter at the beginning of the transmission, acknowledgment packet or negative acknowledgment packet for each transmission, re-sent data packets if no acknowledgment packets are received by the transmitter, or another data that are being transmitted over the monitored network 140.

Depending on the type of the monitored network 140, the nodes 160 on the monitored network 140 may switch channels from time to time according to channel hopping sequences to perform communication. In this scenario, because the network tap device 150 is part of the monitored network 140, the network tap device 150 is aware of the channel hopping sequence. The network tap device 150 can thus hop to different channels according to the channel hopping sequences to detect network traffics on the monitored network 140. If different channel hopping sequences are used for different pairs of nodes 160, the network tap device 150 can be configured to sample the pairwise communications. For instance, the network tap device 150 can switch to a first channel for a period of time according to the channel hopping sequence between nodes A and B to detect the traffic data between nodes A and B. The network tap device 150 can then switch to a second channel for another period of time according to the channel hopping sequence between nodes C and D to detect the traffic data between nodes these two nodes. In this way, the network tap device 150 can sample the communications between pairs of nodes 160 even though the nodes 160 communicate on different channels.

In some examples, the network tap device 150 is further configured to validate the integrity of the network traffic it receives from the monitored network 140 and decrypt the traffic data. If the validation or the decryption fails, the network tap device 150 can also include an indication of the validation or decryption error in the collected data 122 such that the monitoring workstation 102 can analyze the problem causing these errors. In some implementations, the network tap device 150 can further collect physical information that is associated with the detected communication data. For instance, the network tap device 150 can be configured to measure the signal strength of messages in the detected traffic data, such as the received-signal strength indicator (RSSI), and include the signal strength information of these messages into the collected data 122. The network tap device 150 can also be configured to measure the symbol rate of the detected traffic data and include such information in the collected data 122.

The network tap device 150 may receive some base level networking traffic and is configured to reply as appropriate. For instance, if the network tap device 150 receives a synchronization message, it will synchronize its clock with the network using the synchronization message so that it can continue to receive network traffic. Further, if the network protocol requires each node on the network 140 to send a certain type of message to the root node 114, such as the destination advertisement object (DAO) message in the routing protocol for low power and lossy networks (RPL), the network tap device 150 is configured to comply with such requirements and send the necessary message at the required time interval. Further examples of the base level networking traffic received by the network tap device 150 can include routing information so that data can be routed to the network tap device 150, network configuration and management traffic, such as a Ping command, key revocation and key updating mechanisms. The network tap device 150 is configured to operate as a leaf node which does not provide routing for network traffic data. The network tap device 150 also does not advertise the presence of a network and therefore does not have child nodes. The network tap device 150 also does not participate in broadcasts, and will not accept broadcast updates. As such, the access point or a network manager of the monitored network 140 can keep the network tap device 150 unknown to the nodes 160 on the monitored network 140 except for the parent node of the network tap device 150 for routing purposes. Further, the network tap device 150 is configured to minimize its transmission so that it can detect as much traffic data as possible.

At block 208, the process 200 involves the network tap device 150 transmitting the collected data 122 to the monitoring workstation 102 over the data transmission network 120. In examples, the network tap device 150 streams the collected data 122 to the monitoring workstation 102. For instance, a file transfer protocol or bulk export protocol can be utilized to transfer collected data 122 as they are received at the network tap device 150. The network tap device 150 can be further configured to throttle or batch collected data 122 in the case where the network connection in the data transmission network 120 incurs data loss. For example, if the data transmission network 120 incurs data loss, the network tap device 150 can be configured to store the collected data 122 in a queue and resume the transmission when the network condition improves. In order to save the memory space of the queue, the network tap device 150 can be configured to implement an algorithm to selectively store the collected data 122, such as storing the last hour of data, or the most time-sensitive data. In further examples, the network tap device 150 may be configured to process the collected data 122 before transmitting it to the monitoring workstation 102, such as detecting patterns (e.g., attack patterns) or abnormalities and flagging the detected patterns or abnormalities in the collected data 122.

At block 210, the process 200 involves the network tap device 150 determining whether to stop the monitoring and stop collecting the network traffic data. The network tap device 150 may determine to stop the monitoring when the headend system 104 instructs to suspend or remove the network tap device 150 from the monitored network 140. For example, the headend system 104 may determine that the monitoring is no longer needed because the debugging is complete or the security issue in the network has been addressed. In other examples, the headend system 104 may determine that the network tap device 150 is to be suspended or removed because the collected data 122 cannot be used to identify the issues associated with the monitored network 140 and the network tap device 150 should be moved to a different location within the monitored network 140. Other reasons may cause the headend system 104 to determine to suspend or remove the network tap device 150 from the monitored network 140. If it is determined that the monitoring should be stopped, the process 200 ends; otherwise, the network tap device 150 continues to collect network traffic data at block 206 and transmit the collected data 122 to the monitoring workstation 102 at block 208.

FIG. 3 shows a flowchart illustrating an example of a process 300 for joining a network tap device to a monitored network, according to certain embodiments of the present disclosure. One or more devices (e.g., the network tap devices 150, the access point of the monitored network 140, or the headend system 104) implement operations depicted in FIG. 3 by executing suitable program code. For illustrative purposes, process 300 is described with reference to certain examples depicted in the figures. Other implementations, however, are possible.

At block 302, the process 300 involves the network tap device 150 initially joining the monitored network 140. Depending on the protocol implemented by the monitored network 140, a network manager, such as an access point, of the monitored network 140 advertises the monitored network 140 to the network tap device 150 or the network tap device 150 advertises itself to the monitored network 140. After the network tap device 150 discovers the monitored network 140 through the advertisement, the network tap device 150 can attempt to join the network. When an authentication server of the monitored network 140, such as the headend system 104, detects that the network tap device 150 is trying to join the monitored network 140, the authentication server can authenticate the network tap device 150 to determine whether to allow the network tap device 150 to join the monitored network 140.

The authentication can be based on information associated with the network tap device 150. For example, the network tap device 150 can have an identifier indicating the type of the device, such as the network tap device. In this way, the authentication server can compare the identifier of the network tap device 150 with a list of network tap devices 150 that are permitted to join the monitored network 140, thereby authenticating the network tap device 150. Alternatively, or additionally, the authentication server can authenticate the network tap device 150 based on its name. The names of the network tap devices 150 can have a common prefix indicating that these devices are network tap devices. In some types of networks, a network device has an associated certificate and a field of the certificate can be utilized to indicate whether the associated device is a network tap device or not. The authentication server can examine the certificate of the network tap device 150 to determine that it is a network tap device 150 permitted to join the monitored network 140.

Once the authentication server authenticates the network tap device 150, the network tap device 150 is allowed to join the network and is associated with the monitored network 140. At this point, the network tap device 150 can communicate with its neighboring devices on the network. However, the network tap device 150 does not have the security keys and credentials of the network 140 and thus it cannot communicate with the rest of the monitored network 140.

At block 304, the process 300 involves authenticating the network tap device 150 so that the network tap device 150 can obtain network keys and credentials. The monitored network 140, or more specifically the network manager of the monitored network 140, can implement any network protocols used to authenticate a normal network device, such as a node 160, to authenticate the network tap device 150 and issue network keys and credentials to the network tap device 150. The authentication can be performed using authentication protocols, such as the extensible authentication protocol (EAP), using certificates or shared secrets, or both. After the network tap device 150 is authenticated and obtains the network keys and credentials, the network tap device 150 is a trusted device on the monitored network 140. The network tap device 150 can listen to both unencrypted and encrypted data on the monitored network 140 and use the network keys to validate the integrity of the data and decrypt the encrypted data. However, at this stage, the network tap device 150 is not a routable device and cannot be found through routing on the monitored network 140.

At block 306, the process involves associating the network tap device 150 with the monitored network 140. At this block, the network tap device 150 sends and receives a series of solicitation and configuration messages to obtain the routing information and network address. Depending on the type of the monitored network 140, the network tap device 150 may get an IP address. At this stage, the network tap device 150 completes the joining process and becomes a network device on the monitored network 140. The network tap device 150 can be reached through its network address and managed by the headend system 104.

Figure 4:
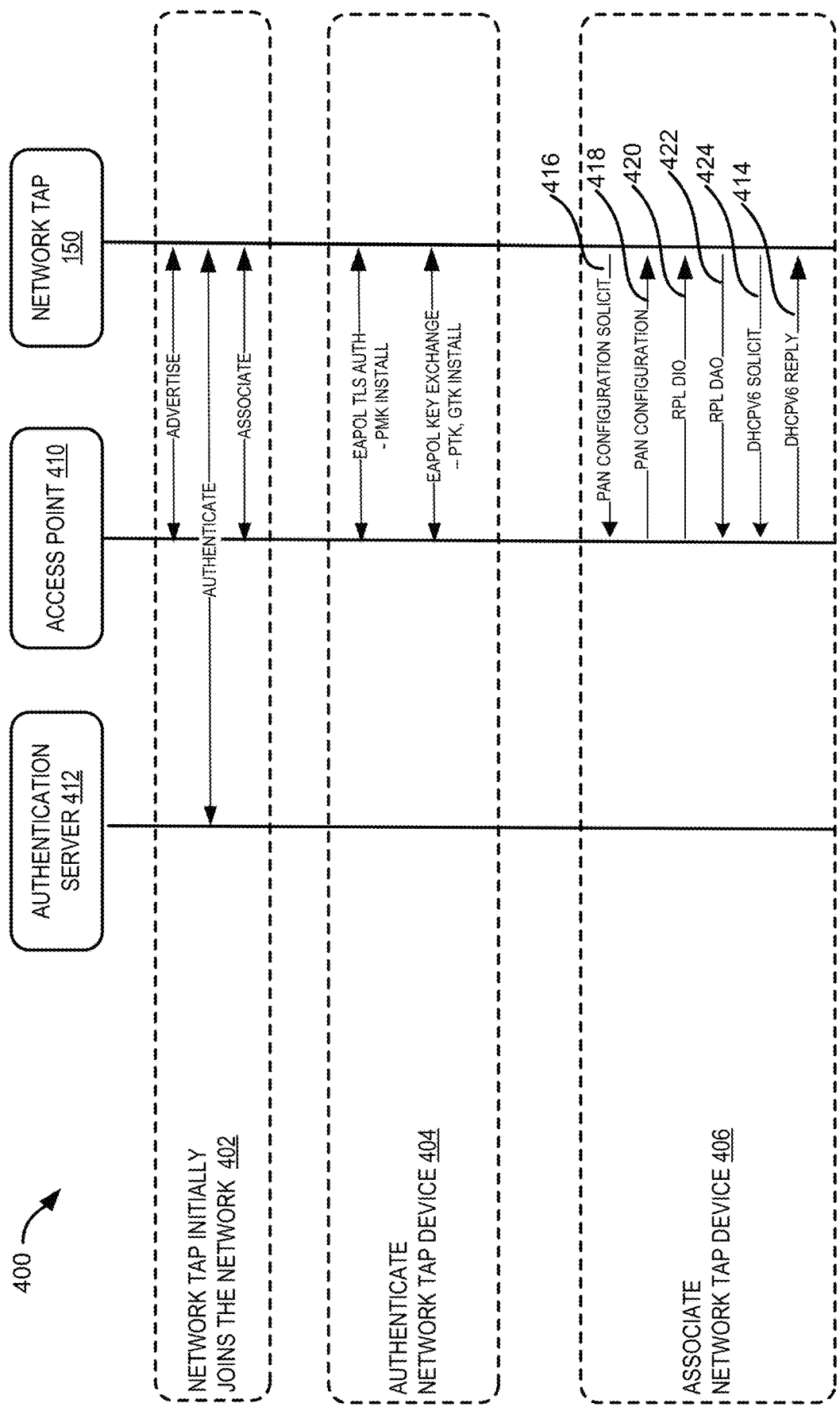
FIG. 4 depicts a signal flow diagram illustrating an example of a process for joining a network tap device to a monitored secure network, according to certain embodiments of the present disclosure.

FIG. 4 depicts a signal flow diagram illustrating an example of a process for joining a network tap device 150 to a monitored network 140, according to certain aspects of the present disclosure. In this example, the monitored network 140 implements a Wi-SUN protocol governed by IEEE 802.15.4g. The process 400 includes four stages: the initial joining stage 402, the authentication stage 404, and the association stage 406. At the initial joining stage 402, the network tap device 150 joins the network 140 by following the normal operations and communications defined by the network protocol implemented in the network 140. This stage includes exchanging advertising messages between the network tap device 150 and the access point 410 so that the network tap device 150 can identify the proper network to join. The network tap device 150 and an authentication server 412 of the monitored network 140 further exchange messages for authenticating the network tap device 150 based on, for example, the identifier, name, certificate, or other information associated with the network tap device 150. The network tap device 150 further communicates with the access point 410 for associating the network tap device 150 with the network 140.

After the network tap device 150 initially joins the network 140, the process 400 proceeds to the authentication stage 404. At this stage, the network tap device 150 communicates with the access point 410 to authenticate itself. If the authentication is successful, the access point 410, under the authorization of the headend system 104, can provide network keys and credentials to the network tap device 150. In the example shown in FIG. 4, the network tap device 150 and the access point 410 exchange messages by following EAP transport layer security (TLS) authentication protocol to authenticate the network tap device 150 and to issue and install pairwise master key (PMK) on the network tap device 150. The PMK can be a shared secret key for one or more sessions of communication and can be used to derive other types of keys in those sessions.

The network tap device 150 and the access point 410 further communicate EAPOL (EAP over LANs) key frames to exchange keys between them. For example, the network tap device 150 and the access point 410 can engage in a four-way handshake process to establish a pairwise transient key (PTK) and a group temporal key (GTK). The PTK is used to encrypt traffic between two network devices, such as between the network tap device 150 and its parent node or between the network tap device 150 and its neighboring node. The GTK is used to decrypt multicast and broadcast traffic. These keys can include a common key shared by multiple devices on the monitored network 140 or a unique key for the network tap device 150. Once the keys are established and installed on the network tap device 150, the network tap device 150 can listen to and decrypt network traffic even if they are protected by encryption.

At the association stage 406, routing information for the network tap device 150 is exchanged and a data link between the network tap device 150 and the monitored network 140 is established. At this stage, the network tap device 150 sends a message 416 to solicit information about the network configuration from the access point 410. The access point 410 replies back with the network configuration information 418 so that the network tap device 150 is properly configured on the network. The access point 410 further sends an RPL (IPv6 Routing Protocol for Low-Power and Lossy Networks) DIO (Destination-Oriented Directed Acyclic Graph Information Object) message 420 to the network tap device 150 to remind the network tap device 150 to periodically advertise itself on the monitored network 140.

In response, the network tap device 150 sends an RPL Destination Advertisement Object (DAO) message 422 to the access point 410 to propagate its destination information (e.g., the address of the network tap device 150) to the monitored network 140 so that other nodes or devices on the monitored network 140, mostly the parent nodes of the network tap device 150, know the current address of the network tap device 150 and can determine the routing to the network tap device 150. Sending the destination information to the access point 410 allows the access point 410 to maintain routing information. After the routing information is determined, the network tap device 150 can communicate on the monitored network 140.

The network tap device 150 further solicits the IP address from the access point 410 through a Dynamic Host Configuration Protocol version 6 (DHCPV6) solicit message 424 and the access point 410 replies with the assigned IP address using a DHCPV6 reply message 414. Once the network tap device 150 is assigned an IP address, the network tap device 150 is interconnected with and is reachable through IP addressing by other network devices on the monitored network 140. The network tap device 150 can operate similarly as other network devices except that the network tap device 150 is configured to minimize its transmissions and focus on receiving traffic data from the monitored network 140.

It should be appreciated that while process 400 is described with a focus on the Wi-SUN protocol for a mesh network, a similar process can be applied to other types of networks and network protocols. Depending on the type of network and the employed network protocol, the messages being communicated among the network tap device 150, the access point 410, and the authentication server 412 might be different. Further, while the above discussion focuses on the scenarios where the network tap device 150 operates within an IP network, similar processes can be applied to the scenarios where the network tap device 150 operates outside an IP network and is configured to communicate with MAC layer messages.

Figure 5:
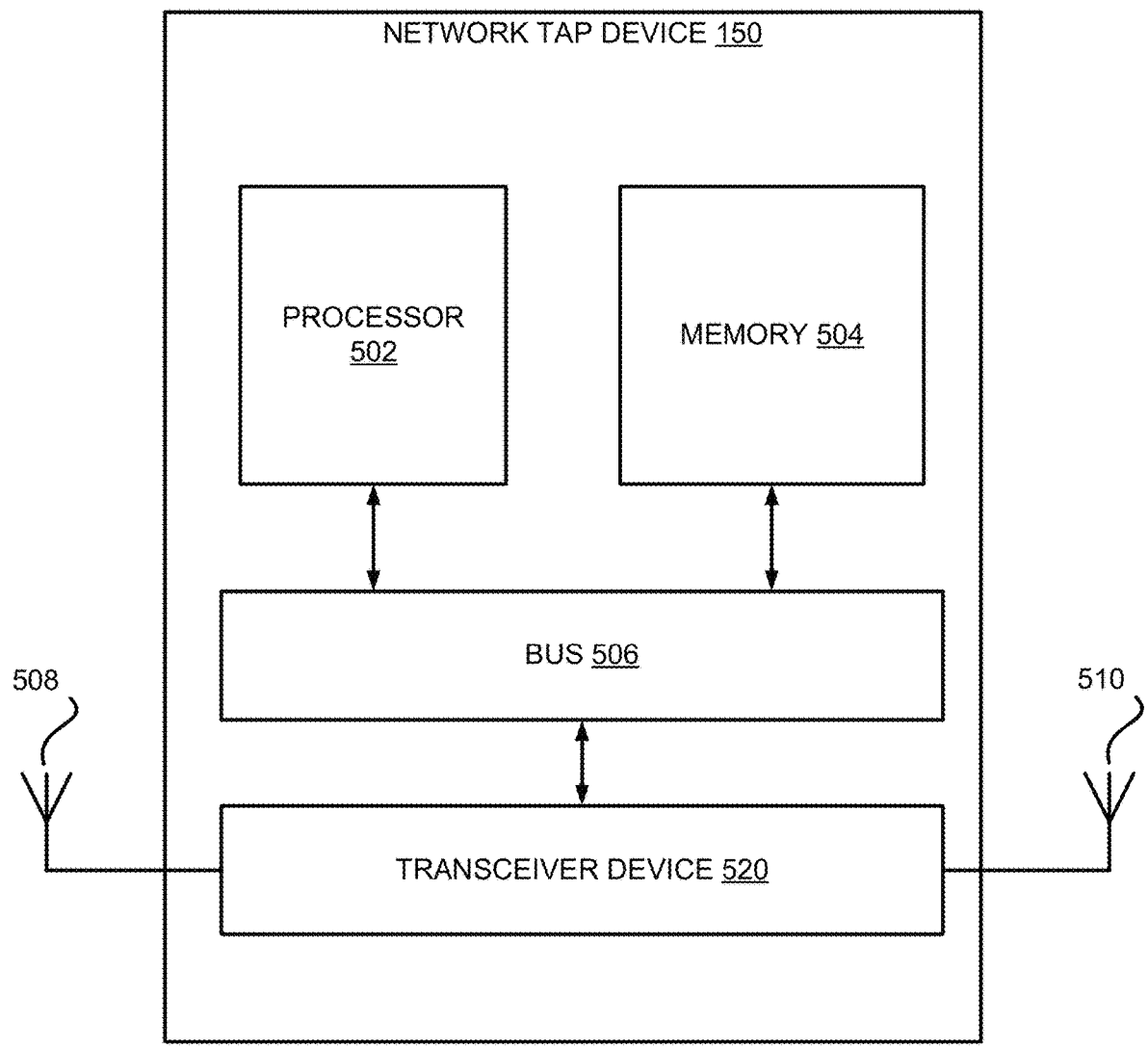
FIG. 5 is a diagram depicting an example of a network tap device that is suitable for implementing aspects of the techniques and technologies presented herein.

Referring to FIG. 5, which shows a diagram depicting an example of a network tap device 150 that is suitable for implementing aspects of the techniques and technologies presented herein. The network tap device 150 can include a processor 502. Non-limiting examples of the processor 502 include a microprocessor, an application-specific integrated circuit (ASIC), a state machine, a field programmable gate array (FPGA), or other suitable processing devices. The processor 502 can include any number of processing devices, including one. The processor 502 can be communicatively coupled to non-transitory computer-readable media, such as memory device 504. The processor 502 can execute computer-executable program instructions and/or access information stored in the memory device 504.

The memory device 504 can store instructions that, when executed by the processor 502, causes the processor 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The network tap device 150 can also include a bus 506. The bus 506 can communicatively couple one or more components of the network tap device 150. Although the processor 502, the memory device 504, and the bus 506 are respectively depicted in FIG. 5 as separate components in communication with one another, other implementations are possible. For example, the processor 502, the memory device 504, and the bus 506 can be respective components of respective printed circuit boards or other suitable devices that can be disposed in network tap device 150 to store and execute programming code.

The network tap device 150 can also include a transceiver device 520 communicatively coupled to the processor 502 and the memory device 504 via the bus 506. Non-limiting examples of a transceiver device 520 include an RF transceiver and other transceivers for wirelessly transmitting and receiving signals. The transceiver device 520 is capable of communicating with the monitored network 140 and the data transmission network 120 via antennas 508 and 510, respectively.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. For example, although a metering implementation has been used for illustration, the invention may be extended to any type of network endpoint that includes a communication module and a second module, separate from the communication module.

The invention claimed is:

1. A system comprising:
   a headend system configured for managing network devices in a monitored network;
   an access point configured for managing communications between a subset of the network devices in the monitored network, the subset of the network devices comprising network nodes and a network tap device unknown to other network devices in the subset of the network devices except for a parent network device of the network tap device; and
   the network tap device in connection with the access point through the monitored network and managed by the access point and the headend system, the network tap device configured for:
      joining the monitored network as a network device of the monitored network, joining the monitored network comprising:
         communicating with the access point to obtain security keys of the monitored network, and
         communicating with the access point to obtain a network address for the network tap device;
      collecting network data for the monitored network, comprising:
         detecting network traffic on the monitored network, the network traffic comprising encrypted data and unencrypted data,
         decrypting the encrypted data in the network traffic using the security keys to generate decrypted data, and
         adding the decrypted data and unencrypted data to the network data;
      connecting to a monitoring workstation via a data transmission network different from the monitored network; and
      transmitting the collected network data to the monitoring workstation via the data transmission network.

2. The system of claim 1, wherein the network tap device is further configured for:
   prior to obtaining the security keys for the monitored network, communicating with the headend system to authenticate the network tap device via the monitored network; and
   the headend system is further configured for:
      authenticating the network tap device based on one or more of an identifier of the network tap device, a name of the network tap device, or a certificate of the network tap device.

3. The system of claim 1, wherein the headend system is configured to manage the network tap device by one or more of:
   sending commands to the network tap device via the monitored network using the network address of the network tap device;
   receiving responses from the network tap device via the monitored network; and
   removing the network tap device from the monitored network.

4. The system of claim 1, wherein the network tap device is further configured for:
   obtaining a channel hopping sequence of the monitored network; and
   switching to different channels at different times according to the channel hopping sequence to detect the network traffic on the monitored network.

5. The system of claim 1, wherein collecting the network data for the monitored network further comprises one or more of:
   identifying a decryption error when decrypting the encrypted data using the security keys and adding an indication of the decryption error in the collected network data;
   detecting signal strength of a message in the network traffic and adding the signal strength of the message to the collected network data; or
   determining a symbol rate of the network traffic and adding the symbol rate to the collected network data.

6. The system of claim 1, wherein the network tap device transmits the collected network data to the monitoring workstation by streaming the collected network data via the data transmission network.

7. The system of claim 1, wherein the monitored network is one of a mesh network associated with a resource distribution network, a wireless network, or a cellular network, and the data transmission network is one or more of an Ethernet, a cellular network, or a power line carrier.

8. The system of claim 1, wherein the network tap device comprises a radio of a plurality of radios of a multi-radio gateway device in the monitored network, the radio being dedicated to the network tap device.

9. The system of claim 1, wherein the network tap device is configured to collect network data for a first region of the monitored network, the system further comprising at least an additional network tap device configured to collect additional network data for at least another region of the monitored network and to transmit the additional network data to the monitoring workstation via the data transmission network.

10. The system of claim 9, further comprising the monitoring workstation configured for:
   receiving the collected network data and the additional network data;
   analyzing the collected network data and the additional network data to generate analysis results; and
   causing one or more network devices in the monitored network to be reconfigured based on the analysis results.

11. A network tap device, comprising:
   a transceiver configured to communicate both in a monitored network and in a data transmission network different from the monitored network, the network tap device being configured for:
  joining the monitored network as a leaf node of the monitored network unknown to a plurality of network devices of the monitored network except for a parent network device of the network tap device, joining the monitored network comprising:
    communicating with a network manager to obtain security keys of the monitored network, and
    communicating with the network manager to obtain a network address for the network tap device;
  collecting network data for the monitored network, comprising:
    detecting network traffic on the monitored network, the network traffic comprising encrypted data and unencrypted data,
    decrypting the encrypted data in the network traffic using the security keys to generate decrypted data, and
    adding the decrypted data and unencrypted data to the network data; and
  transmitting the collected network data to a monitoring workstation via the data transmission network.

12. The network tap device of claim 11, wherein collecting the network data for the monitored network further comprises one or more of:
  identifying a decryption error when decrypting the encrypted data using the security keys and adding an indication of the decryption error in the collected network data;
  detecting signal strength of a message in the network traffic and adding the signal strength of the message to the collected network data; or determining a symbol rate of the network traffic and adding the symbol rate to the collected network data.

13. The network tap device of claim 11, wherein joining the monitored network comprising:
  communicating with a headend system of the monitored network to authenticate the network tap device, wherein the headend system is configured to authenticate the network tap device based on one or more of an identifier of the network tap device, a name of the network tap device, or a certificate of the network tap device.

14. The network tap device of claim 11, wherein transmitting the collected network data to the monitoring workstation comprises streaming the collected network data via the data transmission network.

15. The network tap device of claim 11, wherein the transceiver comprises a radio of a plurality of radios of a multi-radio gateway device in the monitored network, the radio being dedicated to the network tap device.

16. A method performed by a network tap device, comprising:
  joining a monitored network as a leaf node of the monitored network unknown to a plurality of network devices of the monitored network except for a parent network device of the network tap device, joining the monitored network comprising:
    communicating with a network manager of the monitored network to obtain security keys of the monitored network, and
    communicating with the network manager to obtain a network address for the network tap device;
  collecting network data for the monitored network, comprising:
    detecting network traffic on the monitored network, the network traffic comprising encrypted data and unencrypted data,
    decrypting the encrypted data in the network traffic using the security keys to generate decrypted data, and
    adding the decrypted data and unencrypted data to the network data;
  connecting to a monitoring workstation via a data transmission network different from the monitored network; and
  transmitting the collected network data to the monitoring workstation via the data transmission network.

17. The method of claim 16, further comprising:
  communicating with a headend system of the monitored network to authenticate the network tap device, wherein the headend system is configured to authenticate the network tap device based on one or more of an identifier of the network tap device, a name of the network tap device, or a certificate of the network tap device.

18. The method of claim 16, further comprising:
  obtaining a channel hopping sequence of the monitored network; and
  switching to different channels at different times according to the channel hopping sequence to detect the network traffic on the monitored network.

19. The method of claim 16, wherein transmitting the collected network data to the monitoring workstation comprises streaming the collected network data to the monitoring workstation via the data transmission network.

20. The method of claim 16, wherein the monitored network is a mesh network associated with a resource distribution network and the data transmission network is one or more of an Ethernet, a cellular network, or a power line carrier.

* * * * *